United States Patent [19]

Lange et al.

[11] Patent Number: 5,393,308
[45] Date of Patent: Feb. 28, 1995

[54] MIXTURES OF AZO DYES FOR NAVY TO BLACK SHADES

[75] Inventors: Arno Lange, Bad Durkheim; Volker Bach, Neustadt; Clemens Grund, Mannheim; Helmut Reichelt, Neustadt; Paul Richter, Friedelsheim, all of Germany

[73] Assignee: BASF Aktiengesellschaft, Ludwigshafen, Germany

[21] Appl. No.: 125,826

[22] Filed: Sep. 24, 1993

[30] Foreign Application Priority Data

Sep. 29, 1992 [DE] Germany .................. 4232558

[51] Int. Cl.⁶ ............ C09B 29/00; D06P 3/54
[52] U.S. Cl. ................................. 8/639; 8/922
[58] Field of Search ......................... 8/639, 922

[56] References Cited

U.S. PATENT DOCUMENTS 4,405,330  9/1983  Bergmann et al. ............ 8/639

FOREIGN PATENT DOCUMENTS 0064221  11/1982  European Pat. Off. .
0078006  5/1983  European Pat. Off. .
2818653  11/1978  Germany .
3112427  10/1982  Germany .
2-225571  7/1990  Japan .

OTHER PUBLICATIONS

Japan Patent #A 26–060 Feb. 8, 1985.
The Chemistry of Synthetic Dyes by K. Kenkataraman vol. III pp. 444–447 1952.
Chemical Abstracts, vol. 114, No. 18, May 6, 1991, Columbus, Ohio, U.S.; Abstract No. 166285u PL-A-148 426 Jan. 31, 1990.
Chemical Abstracts, vol. 114, No. 18, May 6, 1991, Columbus, Ohio, U.S.; Abstract No. 166284t PL-A-148 425, Jan. 31, 1990.
Derwent Publications Ltd., London, GB; AN 90-316742 & JP-A-2 225 571 (Mitsui Toatsu Chemicals), Sep. 7, 1990.
Derwent Publications Ltd., London, GB; AN 85-071749 & JP-A-60 026 060 (Mitsui Toatsu Chemicals) Feb. 8, 1985.

Primary Examiner—Christine Skane
Assistant Examiner—Margaret Einsmann
Attorney, Agent, or Firm—Oblon, Spivak, McClelland, Maier & Neustadt

[57] ABSTRACT

There are described dye mixtures containing
a) an azo dye of the formula I

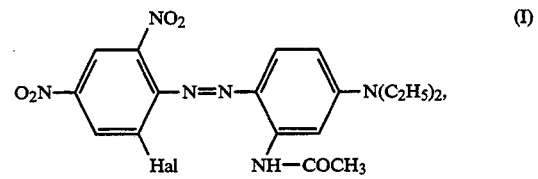

where Hal is chlorine or bromine,
b) the azo dye of the formula II

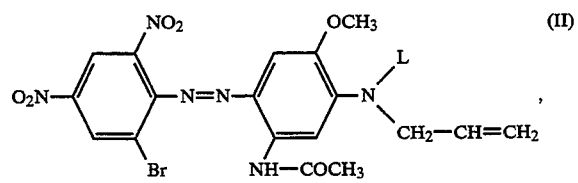

where L is allyl or optionally hydrogen, and
c) an azo dye of the formula III and/or IV

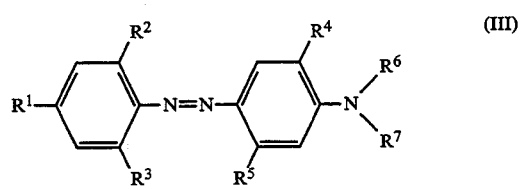

(Abstract continued on next page.)

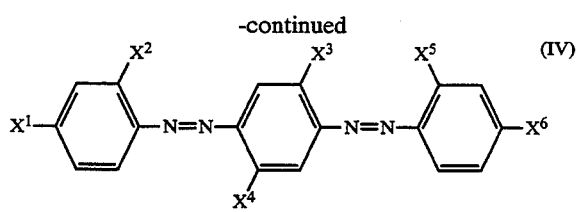

where
- $R^1$ is nitro or substituted or unsubstituted $C_1$-$C_4$-alkylsulfonyl,
- $R^2$ and $R^3$ are each hydrogen, chlorine or bromine,
- $R^4$ and $R^5$ are each hydrogen or chlorine,
- $R^6$ and $R^7$ are each hydrogen, phenyl or substituted or unsubstituted $C_1$-$C_4$-alkyl,
- $X^1$ is hydrogen, hydroxyl, methoxy, acetylamino or nitro,
- $X^2$, $X^3$, $X^4$ and $X^5$ are each hydrogen, methyl or methoxy, and
- $X^6$ is hydroxyl, 2-hydroxyethoxy, formyl or methoxycarbonylamino, dye preparations containing the novel dye mixtures, and the use of the novel dye mixtures for dyeing or printing polyesters in textile form.

7 Claims, No Drawings

MIXTURES OF AZO DYES FOR NAVY TO BLACK SHADES

The present invention relates to novel dye mixtures containing, in each case based on the total weight of the dyes, a) from 20 to 45% by weight of at least one azo dye of the formula I

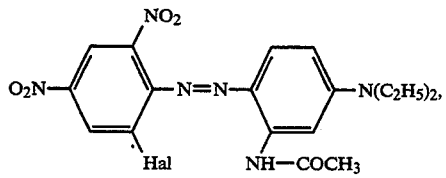

where Hal is chlorine or bromine, b) from 15 to 70% by weight of the azo dye of the formula IIa

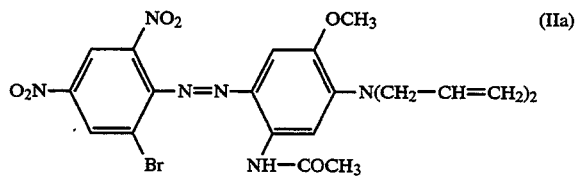

and optionally of the dye of the formula IIb

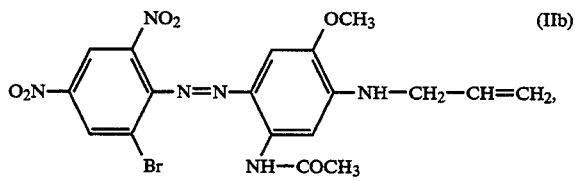

the proportion of dye IIa being from 50 to 100% by weight and the proportion of dye IIb being from 0 to 50% by weight, each percentage being based on the weight of dye IIa or IIb, and c) from 1 to 55% by weight of at least one azo dye of the formula III or IV

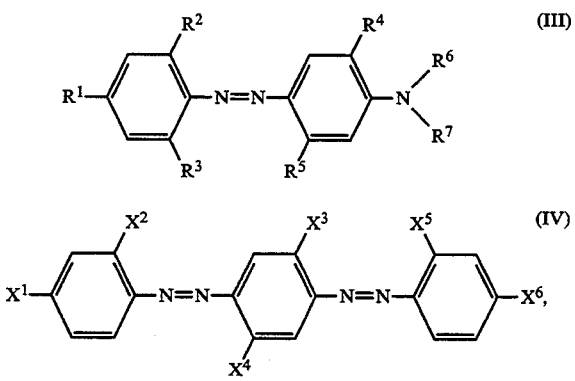

where
$R^1$ is nitro or $C_1$-$C_4$-alkylsulfonyl, which may be hydroxyl-substituted,
$R^2$ is bromine,
$R^3$ is hydrogen or bromine or $R^2$ and $R^3$ may also be independently of one another hydrogen or chlorine,
$R^4$ is hydrogen chlorine or methyl,
$R^5$ is hydrogen or chlorine,
$R^6$ and $R^7$ are independently of one another hydrogen, phenyl or $C_1$-$C_4$-alkyl, which may be hydroxyl-, phenoxy-, 2-cyanoethoxy-, acetyloxy-, phenoxyacetyloxy-, benzoyloxy-, methoxycarbonyloxy- or phenylaminocarbonyloxy-substituted, or else, when $R^2$ and $R^3$ are each hydrogen or chlorine, $C_1$-$C_4$-cyanoalkyl,
$X^1$ is hydrogen, hydroxyl, methoxy, acetylamino or nitro,
$X^2$, $X^3$, $X^4$ and $X^5$ are independently of one another hydrogen, methyl or methoxy, and
$X^6$ is hydroxyl, 2-hydroxyethoxy, formyl or methoxy-carbonylamino,
with the proviso that the sum of the dyes mentioned under a), b) and c) is 100% by weight, dye preparations comprising the novel dye mixtures, and the use of the novel dye mixtures for dyeing or printing polyesters in textile form.

JP-A-26060/1985 and US-A-4 405 330 disclose dyeing mixtures which inter alia contain the dyes of the abovementioned formulae I and IIa. Furthermore DE-A-2 818 653 describes dye mixtures containing a dye of the formula I as one of the components. However, it has been found that these dye mixtures have application defects.

It is an object of the present invention to provide novel dye mixtures which likewise contain the dyes of the formulae I and IIa. The novel mixtures shall on application produce navy to black shades and have good application properties, in particular a neutral evening shade. By this is meant that a dyeing has the same appearance in daylight and in artificial light. Colorimetrically, this characteristic can be determined by ISO 7724-3-1984.

We have found that this object is achieved by the dye mixtures defined at the beginning.

Any alkyl appearing in the formulae III and IV may be straight-chain or branched.

$R^1$ is for example methylsulfonyl, ethylsulfonyl, propylsulfonyl, isopropylsulfonyl, butylsulfonyl or 2-hydroxyethylsulfonyl.

$R^6$ and $R^7$ are each for example methyl, ethyl, propyl, isopropyl, butyl, isobutyl, sec-butyl, 2-hydroxyethyl, 2- or 3-hydroxypropyl, 2- or 4-hydroxybutyl, 2-phenoxyethyl, 2- or 3-phenoxypropyl, 2-(2-cyanoethoxy)ethyl, 2-acetyloxyethyl, 2-phenoxyacetyloxyethyl, 2-benzoyloxyethyl, 2-methylcarbonyloxyethyl, 2-phenylaminocarbonyloxyethyl or 2-cyanoethyl.

Preference is given to dye mixtures containing at least one azo dye of the formula III or IV where $R^1$ is nitro, $R^2$ and $R^3$ are both hydrogen or both chlorine,
$R^4$ is hydrogen, chlorine or methyl,
$R^5$ is hydrogen, and
$R^6$ and $R^7$ are independently of one another hydrogen, phenyl, $C_1$-$C_4$-alkyl or hydroxyl-, phenoxy-, 2-cyanoethoxy-, acetyloxy-, phenoxyacetyloxy-, benzoyloxy-, methoxycarbonyloxy-, phenylaminocarbonyloxy- or cyano-substituted ethyl,
and $X^1$, $X^2$, $X^3$, $X^4$, $X^5$ and $X^6$ are each as defined above.

Attention is drawn in particular to mixtures containing at least one azo dye of the formula III or IV with the following substitution pattern:

| | Dyes of the formula III: | | | | | | |
|---|---|---|---|---|---|---|---|
| | $R^1$ | $R^2$ | $R^3$ | $R^4$ | $R^5$ | $R^6$ | $R^7$ |
| a) | $NO_2$ | H | H | H | H | H | H |
| b) | $NO_2$ | H | H | H | H | $CH_3$ | $NCC_2H_4$ |
| c) | $NO_2$ | H | H | H | H | $C_2H_5$ | $NCC_2H_4$ |
| d) | $NO_2$ | H | H | H | H | $C_4H_9$ | $NCC_2H_4$ |
| e) | $NO_2$ | H | H | H | H | $CH_3COOC_2H_4$ | $NCC_2H_4$ |
| f) | $NO_2$ | H | H | H | H | $C_6H_5$ | H |
| g) | $NO_2$ | H | H | $CH_3$ | H | $HOC_2H_4$ | H |
| h) | $NO_2$ | Cl | Cl | H | H | $CH_3$ | $HOC_2H_4$ |
| i) | $NO_2$ | Cl | Cl | H | H | $HOC_2H_4$ | $HOC_2H_4$ |
| j) | $NO_2$ | Cl | Cl | H | H | $HOC_2H_4$ | $C_2H_5$ |
| k) | $NO_2$ | Cl | Cl | H | H | $CH_3COOC_2H_4$ | $NCC_2H_4$ |
| l) | $NO_2$ | H | H | H | H | $C_6H_5NHCOOC_2H_4$ | $NCC_2H_4$ |
| m) | $NO_2$ | H | H | H | H | $C_6H_5OCH_2COOC_2H_4$ | $NCC_2H_4$ |
| n) | $NO_2$ | H | H | Cl | H | H | $HOC_2H_4OH$ |
| o) | $NO_2$ | H | H | Cl | H | $CH_3COOC_2H_4$ | $CH_3COOC_2H_4$ |
| p) | $NO_2$ | Cl | Cl | H | H | $HOC_2H_4$ | $NCC_2H_4$ |
| q) | $NO_2$ | Cl | Cl | H | H | $C_6H_5OCOC_2H_4$ | $NCC_2H_4$ |
| r) | $NO_2$ | H | H | H | H | $CH_3COOC_2H_4$ | $CH_3COOC_2H_4$ |
| s) | $NO_2$ | Cl | Cl | Cl | H | H | $NCC_2H_4$ |
| t) | $NO_2$ | Cl | Cl | H | H | $CH_3OCOOC_2H_4$ | $CH_3OCOOC_2H_4$ |
| u) | $NO_2$ | Cl | Cl | H | H | $CH_3COOC_2H_4$ | $CH_3COOC_2H_4$ |
| v) | $NO_2$ | H | H | H | H | $NCC_2H_4OC_2H_4$ | $NCC_2H_4$ |
| w) | $NO_2$ | H | H | H | H | $C_6H_5OCOC_2H_4$ | $NCC_2H_4$ |
| x) | $NO_2$ | Cl | Cl | Cl | H | $C_6H_5OC_2H_4$ | $NCC_2H_4$ |
| y) | $HOC_2H_4SO_2$ | Cl | Cl | H | Cl | $C_2H_5$ | $C_2H_5$ |

| | Dyes of the formula IV: | | | | | |
|---|---|---|---|---|---|---|
| | $X^1$ | $X^2$ | $X^3$ | $X^4$ | $X^5$ | $X^6$ |
| a) | $NO_2$ | H | H | H | H | HO |
| b) | $NO_2$ | H | $CH_3O$ | H | H | HO |
| c) | $NO_2$ | H | $CH_3O$ | $CH_3$ | H | HO |
| d) | H | H | $CH_3O$ | $CH_3O$ | H | HO |
| e) | HO | H | $CH_3$ | H | H | CHO |
| f) | HO | H | $CH_3$ | $CH_3O$ | H | $HOC_2H_4O$ |
| g) | HO | $CH_3$ | H | H | $CH_3$ | HO |
| h) | H | H | $CH_3O$ | $CH_3$ | H | HO |
| i) | HO | H | $CH_3$ | H | H | $CH_3OCONH$ |
| j) | $CH_3O$ | H | H | $CH_3$ | H | HO |
| k) | $CH_3OCONH$ | H | H | $CH_3$ | H | HO |
| l) | $NO_2$ | H | $CH_3$ | $CH_3$ | H | $OC_2H_4O$ |

Particular attention is drawn to mixtures containing at least one azo dye of the formula IIId, IIIk or IVb.

Advantageous dye mixtures are those which contain from 70 to 90% by weight of the dye of the formula IIa and from 10 to 30% by weight of the dye of the formula IIb, each percentage being based on the weight of dyes IIa and IIb.

The novel dye mixtures contain, each percentage being based on the total weight of the dyes, a) from 20 to 45% by weight, preferably from 27 to 40% by weight, of at least one azo dye of the formula I, b) from 15 to 70% by weight, preferably from 20 to 65% by weight, of the azo dye of the formula IIa and optionally of an azo dye of the formula IIb and c) from 1 to 55% by weight, preferably from 5 to 50% by weight, of at least one azo dye of the formula III or IV, with the proviso that the sum of the dyes mentioned under a), b) and c) is 100% by weight.

Dye mixtures for black shades contain in particular, each percentage being based on the total weight of the dyes, a) from 25 to 45% by weight of at least one azo dye of the formula I, b) from 15 to 40% by weight, of the azo dye of the formula IIa and optionally of the azo dye of the formula IIb, and c) from 30 to 55% by weight of at least one azo dye of the formula III or IV, with the proviso that the sum of the dyes mentioned under a), b) and c) is 100% by weight.

Dye mixtures for navy shades contain in particular, each percentage being based on the weight of the dyes, a) from 30 to 40% by weight of at least one azo dye of the formula I,-b) from 35 to 70% by weight, of the azo dye of the formula IIa and optionally of the azo dye of the formula IIb, and c) from 2 to 10% by weight of at least one azo dye of the formula III or IV, with the proviso that the sum of the dyes mentioned under a), b) and c) is 100% by weight.

The dyes of the formulae I, IIa, IIb, III and IV are in general known dyes. They are known for example from DE-A-2 818 653, DE-A-3 112 427, EP-A-64 221 or from Venkataraman, The Chemistry of Synthetic Dyes, Vol. III, pages 444 to 447, or can be obtained by the methods mentioned therein.

The preparation of the dye mixtures of the invention is effected in a conventional manner, for example by mixing the respective dye components in the stated weight ratio. The novel mixtures may optionally contain other kinds of components, for example dispersants, such as lignin sulfonates or sulfonation products of the reaction product of formaldehyde with aromatics, or other auxiliaries. It is also possible to mix ready-prepared dye preparations of the respective dye components or ready-prepared dye preparations with pure dyes.

Accordingly, the present invention further provides dye preparations containing from 15 to 60% by weight, based on the weight of the dye preparation, of an above-defined dye mixture and from 40 to 85% by weight, based on the weight of the dye preparation, of a dispersant.

The novel dye mixtures are suitable for dyeing or printing polyesters in textile form. For the purposes of the present invention this means textile forms such as fibers, knitted fabrics or woven fabrics comprising polyester or blend fabrics of polyesters with cotton, wool, cellulose acetate or triacetate. The dyeings or prints obtained have navy to black shades. The dyeing and printing processes are known per se. Further details may also be found in the Examples.

The dye mixtures of the invention produce strong dyeings and have a neutral evening shade. They also have excellent production properties.

The invention will now be more particularly described by way of example.

DYEING METHOD 10 g of polyester fabric are introduced at 50° C. into 200 ml of a dyeing liquor containing X% by weight, based on the polyester fabric, of a dye preparation and whose pH has been set to 4.5 with acetic acid. After 5 minutes at 50° C. the liquor is raised over 30 minutes to 130° C., maintained at that temperature for 60 minutes and then cooled down over 20 minutes to 60° C.

The dyed polyester fabric is then reduction cleared by treating it for 15 minutes at 65° C. in 200 ml of a liquor containing per liter 5 ml of 32% strength by weight sodium hydroxide solution, 3 g of sodium dithionite and 1 g of an addition product of 48 mol of ethylene oxide with 1 mol of castor oil. Finally the fabric is rinsed, neutralized with dilute acetic acid, rinsed once more and dried.

The abovementioned dye preparation contained in each case 40% by weight of dye mixture and 60% by weight of a dispersant based on lignin sulfonate, each percentage being based on the weight of the preparation.

The dye mixture had the composition indicated below in the table, the following dyes being used:

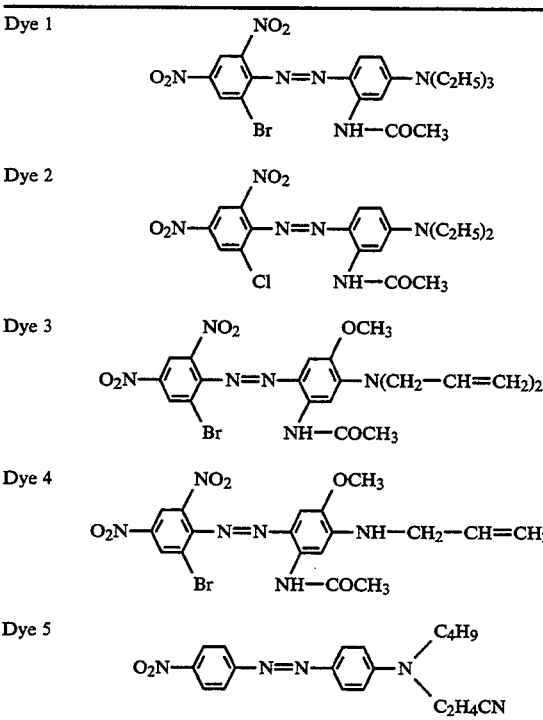

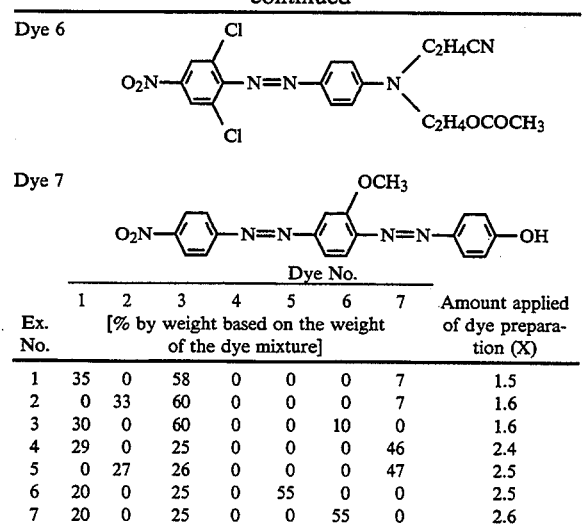

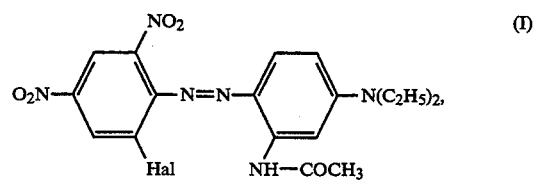

| Ex. No. | \[% by weight based on the weight of the dye mixture\] | | | | | | | Amount applied of dye preparation (X) |
|---|---|---|---|---|---|---|---|---|
| | 1 | 2 | 3 | 4 | 5 | 6 | 7 | |
| 1 | 35 | 0 | 58 | 0 | 0 | 0 | 7 | 1.5 |
| 2 | 0 | 33 | 60 | 0 | 0 | 0 | 7 | 1.6 |
| 3 | 30 | 0 | 60 | 0 | 0 | 10 | 0 | 1.6 |
| 4 | 29 | 0 | 25 | 0 | 0 | 0 | 46 | 2.4 |
| 5 | 0 | 27 | 26 | 0 | 0 | 0 | 47 | 2.5 |
| 6 | 20 | 0 | 25 | 0 | 55 | 0 | 0 | 2.5 |
| 7 | 20 | 0 | 25 | 0 | 0 | 55 | 0 | 2.6 |

The mixtures of Examples 1 to 3 each produced strong navy dyeings, while those of Examples 4 to 7 each produced strong black dyeings.

We claim:

1. Dye mixtures containing, in each case based on the total weight of the dyes,
   a) from 20 to 45% by weight of at least one azo dye of the formula I

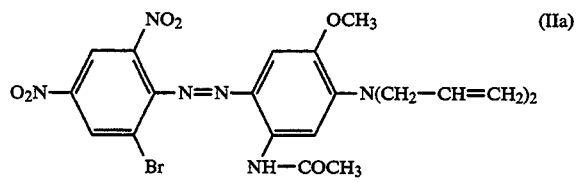

where Hal is chlorine or bromine,
   b) from 15 to 70% by weight of the azo dye of the formula IIa

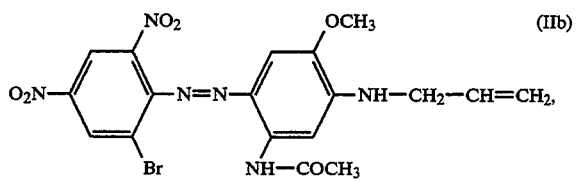

and optionally of the dye of the formula IIb the proportion of dye IIa being from 50 to 100% by weight and the proportion of dye IIb being from 0 to 50% by weight, each percentage being based on the weight of dye IIa or IIb, and
   c) from 1 to 55% by weight of at least one azo dye of the formula III or IV

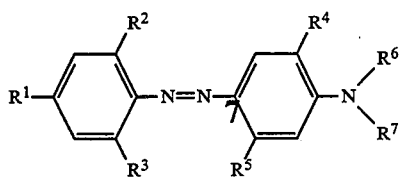

(III)

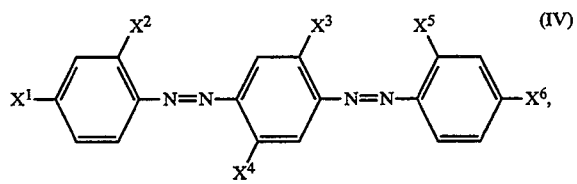

(IV)

where $R^1$ is nitro or $C_1$-$C_4$-alkylsulfonyl, which may be hydroxyl-substituted, $R^2$ is bromine, chlorine or hydrogen $R^3$ is hydrogen, chlorine or bromine, $R^4$ is hydrogen, methyl or chlorine, $R^5$ is hydrogen or chlorine, $R^6$ and $R^7$ are independently of one another hydrogen, phenyl or $C_1$-$C_4$-alkyl, which may be hydroxyl-, phenoxy-, 2-cyanoethoxy-, acetyloxy-, phenoxyacetyloxy-, benzoyloxy-, methoxycarbonyloxy- or phenylaminocarbonyloxy-substituted, $X^1$ is hydrogen, hydroxyl, methoxy, acetylamino or nitro, $X^2$, $X^3$, $X^4$ and $X^5$ are independently of one another hydrogen, methyl or methoxy, and $X^6$ is hydroxyl, 2-hydroxyethoxy, formyl or methoxy-carbonylamino, with the proviso that the sum of the dyes mentioned under a), b) and c) is 100% by weight.

2. Dye mixtures as claimed in claim 1 containing at least one azo dye of the formula III or IV where
$R^1$ is nitro,
$R^2$ and $R^3$ are both hydrogen or both chlorine,
$R^4$ is hydrogen, chlorine or methyl,
$R^5$ is hydrogen, and
$R^6$ and $R^7$ are independently of one another hydrogen, phenyl, $C_1$-$C_4$-alkyl or hydroxyl-, phenoxy-, 2-cyanoethoxy-, acetyloxy-, phenoxyacetyloxy-, benzoyloxy-, methoxycarbonyloxy- or phenylaminocarbonyloxy-,
and $X^1$, $X^2$, $X^3$, $X^4$, $X^5$ and $X^6$ are each as defined in claim 1.

3. Dye preparations containing from 15 to 60% by weight, based on the weight of the dye preparation, of a dye mixture as claimed in claim 1 and from 40 to 85% by weight, based on the weight of the dye preparation, of a dispersant.

4. A method comprising dyeing or printing polyesters in textile form with dye mixtures as defined in claim 1.

5. Dye mixtures as claimed in claim 1, containing from 70–90% by weight of the dye of formula IIa and from 10–30% by weight of the dye of formula IIb, each percentage being based on the weight of dyes IIa and IIb.

6. Dye mixtures as claimed in claim 1, wherein the azo dye of c) is of the formula (III).

7. Dye mixtures as claimed in claim 1, wherein the azo dye of c) is of the formula (IV).

* * * * *